US007648145B2

(12) United States Patent
Wilson et al.

(10) Patent No.: US 7,648,145 B2
(45) Date of Patent: Jan. 19, 2010

(54) DYNAMICALLY ADJUSTABLE PANHARD BAR

(76) Inventors: Steve Wilson, 1218 Puerta Del Sol, San Clemente, CA (US) 92673; Seth Wilson, 1218 Puerta Del Sol, San Clemente, CA (US) 92673

(*) Notice: Subject to any disclaimer, the term of this patent is extended or adjusted under 35 U.S.C. 154(b) by 379 days.

(21) Appl. No.: 11/769,642

(22) Filed: Jun. 27, 2007

(65) Prior Publication Data
US 2009/0001677 A1  Jan. 1, 2009

(51) Int. Cl.
*B60G 17/016* (2006.01)
(52) U.S. Cl. ............ 280/5.52; 280/5.508; 280/124.107; 280/89.12
(58) Field of Classification Search .............. 280/5.511, 280/5.508, 5.51, 5.509, 5.52, 5.506, 5.502, 280/124.106, 124.107, 89.12, 89.13
See application file for complete search history.

(56) References Cited

U.S. PATENT DOCUMENTS

| 3,023,023 | A | * | 2/1962 | Wilson ............... 280/5.509 |
| 3,044,799 | A | * | 7/1962 | Fiala ................. 280/5.508 |
| 3,649,042 | A | * | 3/1972 | Allison ................ 280/5.52 |
| 4,279,428 | A | * | 7/1981 | Onodera .............. 280/124.108 |
| 4,484,767 | A | * | 11/1984 | Klem ................. 280/124.107 |
| 4,573,702 | A | * | 3/1986 | Klem ................. 280/5.504 |
| 5,016,905 | A | * | 5/1991 | Licari ................. 280/677 |
| 6,086,075 | A | * | 7/2000 | O'Bryan et al. ......... 280/89.12 |
| 6,523,844 | B2 | * | 2/2003 | Panizzolo ............ 280/124.111 |
| 6,616,158 | B2 | * | 9/2003 | Panizzolo et al. ..... 280/124.111 |
| 6,725,957 | B2 | * | 4/2004 | Sutton ................. 180/89.14 |
| 7,270,341 | B2 | * | 9/2007 | Longworth et al. .... 280/124.11 |
| 2001/0042654 | A1 | * | 11/2001 | Ratcliffe et al. ........... 180/349 |
| 2002/0101052 | A1 | * | 8/2002 | Panizzolo ............ 280/124.111 |
| 2003/0020323 | A1 | * | 1/2003 | Smith ................. 301/124.1 |
| 2006/0033298 | A1 | * | 2/2006 | Longworth et al. .... 280/124.11 |
| 2006/0208444 | A1 | * | 9/2006 | Johnson et al. ........ 280/124.111 |
| 2009/0223322 | A1 | * | 9/2009 | Kossira et al. ............ 74/828 |

* cited by examiner

*Primary Examiner*—Paul N Dickson
*Assistant Examiner*—Drew Brown
(74) *Attorney, Agent, or Firm*—QuickPatents, Inc.; Kevin Prince

(57) ABSTRACT

The invention is a panhard bar that can alter the tracking offset while the car is in motion, and allow the driver of the car the ability to change the tracking as the driver desires, thus improving the turning ability of the car as the track condition changes. The present invention mechanically lengthens or shortens the panhard bar thus moving the axle to the left or right. This then changes the tracking of the front to rear wheels. Adjusting means are placed in reach of the driver to accomplish the change. In another embodiment the adjustment means is not controlled by the driver, but rather by a characteristic reaction of the car. The adjustments means may respond to the front wheels turning to the left or right, to deceleration forces indicating a turn on the track is approaching, and to acceleration forces indicating the straightaway of the track is approaching.

9 Claims, 3 Drawing Sheets

DYNAMICALLY ADJUSTABLE PANHARD BAR

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to vehicle suspensions, and more particularly to a dynamic panhard bar for racing vehicles.

BACKGROUND OF THE INVENTION

Vehicles, particularly racecars like stock cars and sprint cars, employ a ridged axle. In the case of a stock car the ridged axle is the rear driven axle, while the front-end suspension is typically of an independent design. Sprint cars utilize a ridged axle at both the front and rear of the car. The chassis is typically sprung and dampened near each of the four wheels. A longitudinal rod with pivoting ends couple the axle to the chassis and restrain for and aft axle motion as well as yaw motion. In addition a lateral mounted bar with pivoting ends couples the axle to the chassis, restraining the axle from lateral movement. The racing industry refers to this lateral rod as a panhard bar.

Wheel tracking refers to the offset or lack of offset between a longitudinal line drawn square from the center of the rear wheel to the front wheel. The front wheel center may be in line with the rear wheel, or offset to the inside or outside. Typically the tracking will have no offsets, which allows the cars to turn equally well both left and right. Oval track cars only turn left as they proceed counterclockwise around the oval track. Both rear wheels are locked to the axle, which makes it very difficult to turn the car.

An advantage to turning left can be made by offsetting the wheel tracking such that the right rear tire is offset outside of the right front tire. Thus the rear-driving tire tries to overturn the car to the left. Prior art utilize offset wheels to accomplish the needed tracking offset. Also commonly used are wheel spacers. These can be inserted between the wheel-axle interfaces. The optimum offset is dictated by the available traction in the track surface. However the track surface will change dramatically during the course of the race. The result is the racecar may turn well at the beginning of the race, but poorly at the end of the race.

Therefore, there is a need for a panhard bar that can be adjusted while the vehicle is in motion. As the driver is most aware of the performance and tracking of the vehicle while in motion, there is a need for the driver to have the ability to adjust the panhard bar while the vehicle is in motion. Additionally, as a driver can be very busy focusing on driving, there is also a need for a panhard bar that is automatically adjusted according to the motion of the vehicle without the need for the driver to adjust the panhard bar. The present invention accomplishes these objectives.

SUMMARY OF THE INVENTION

The present invention is a panhard bar for a vehicle having a chassis, an axle, and a cockpit for a driver. A first rod is fixed to the chassis with a first attachment means at a first end thereof. A second rod is fixed to the axle with a second attachment means at a first end thereof.

An adjustment means is fixed to a second end of the first rod and the second end of the second rod. The adjustment means allows for selective adjustment of the relative positions of each second end with respect to the other second end. An actuator is interconnected to the adjustment means and fixed within the vehicle cockpit in reach of the driver.

A preferred embodiment of the adjustment means includes a hydraulic cylinder fixed at either end to the second ends of the first and second rods. The hydraulic cylinder is adapted to adjust the relative distance of each second end with the other second end.

An alternate embodiment of the second rod further includes a first manual adjustment means comprising a turnbuckle mechanism for effectively lengthening or shortening the second rod. An alternate embodiment of the first rod further includes a second manual adjustment means comprising a turnbuckle mechanism for effectively lengthening or shortening the first rod.

The actuator allows the driver to actuate the adjustment means while the vehicle is in motion to adjust the position of the axle with respect to the chassis. The panhard bar can be used with either a front axle or a rear axle of the vehicle. Changing the position of either axle towards the left or right of the chassis changes the tracking of the vehicle. Adjusting the tracking of the vehicle changes the turning ability of the vehicle. Changing the turning ability of the vehicle is often desired as track conditions change.

An alternative embodiment of the panhard bar includes an adjustment means including a weight suspended on a shaft. The weight is moved by inertia based on the movement of the vehicle. In this alternate embodiment of the panhard bar, the adjustment means controls the tracking of the axle with respect to the chassis based on the movement of the vehicle.

The present device is a panhard bar that can be adjusted while the vehicle is in motion. Further, the present invention allows the driver of the vehicle to adjust the panhard bar while the vehicle is in motion. Moreover, the present invention can be automatically adjusted according to the motion of the vehicle. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
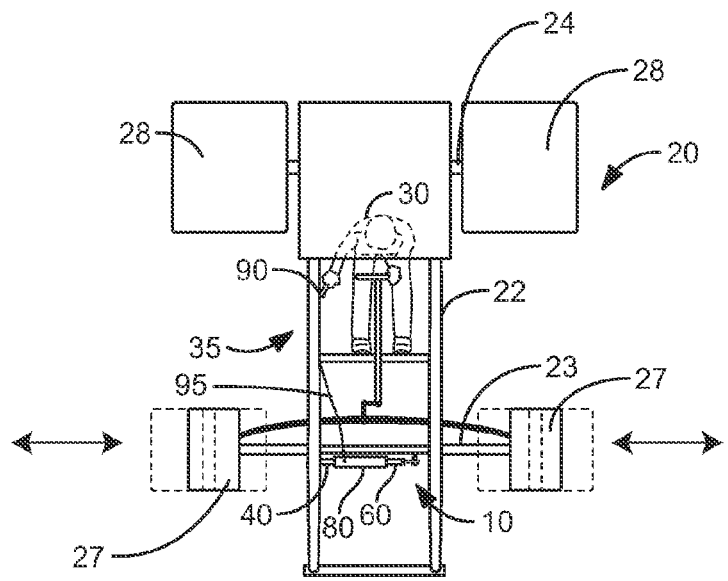
FIG. 1 is a top plan view of a vehicle, illustrating a driver and a panhard bar.
Figure 2:
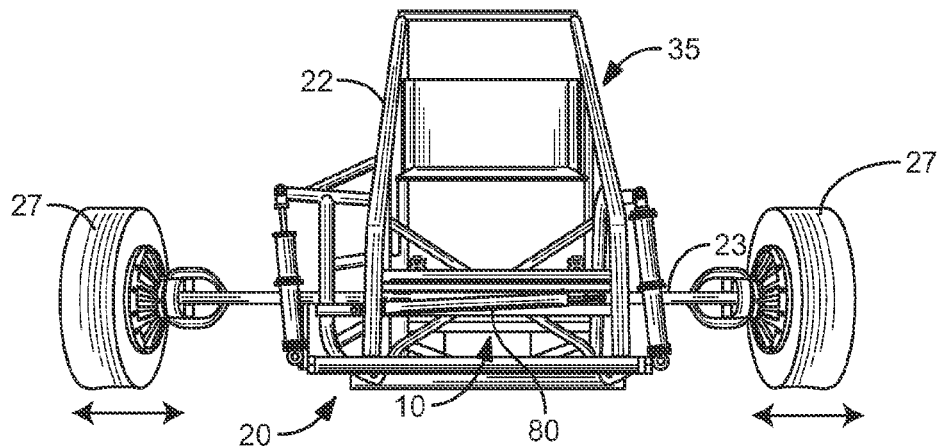
FIG. 2 is a front elevational view of the invention, illustrating a panhard bar attached to an axle and chassis.
Figure 3:
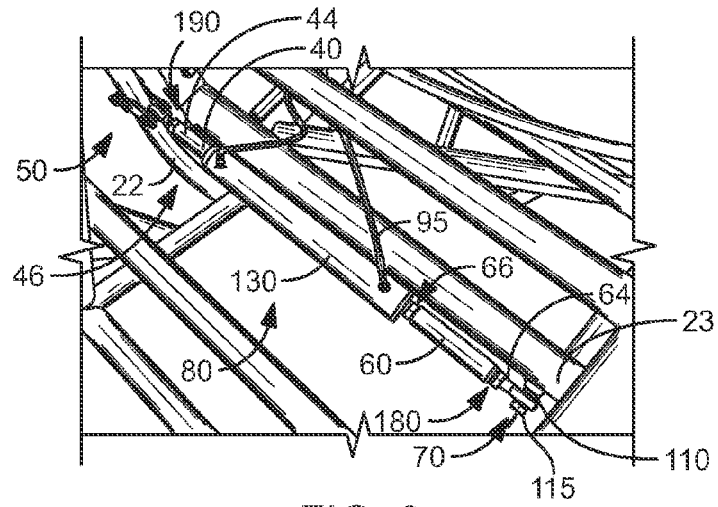
FIG. 3 is a perspective view of the invention, illustrating a first rod, a second rod, and an adjustment means.
Figure 7:
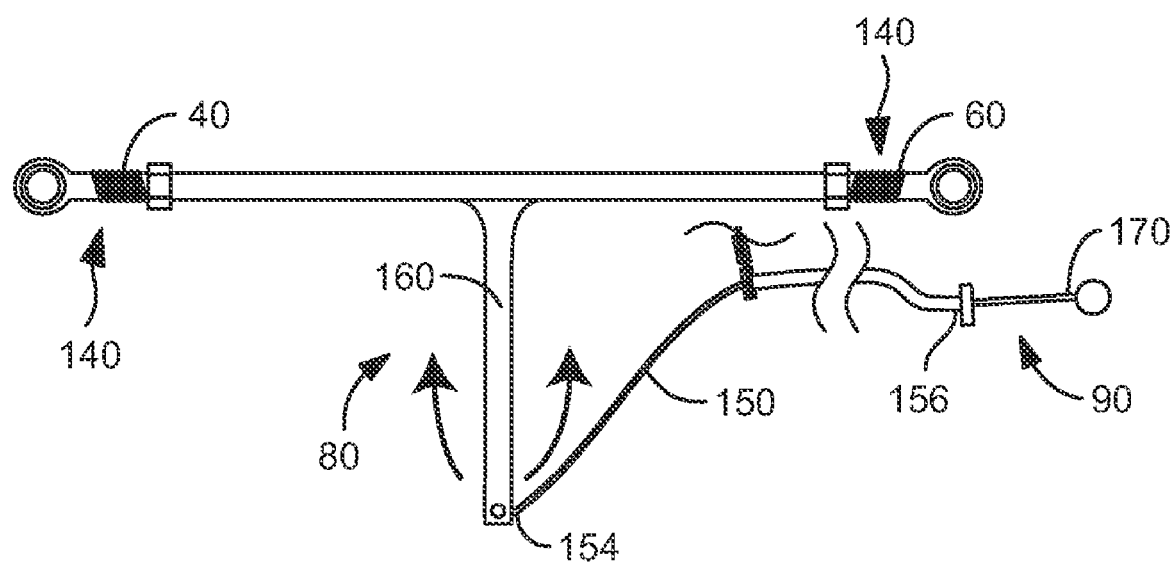
FIG. 7 is a side elevational view of the invention, illustrating an adjustment means using a cable and levers.
Figure 8:
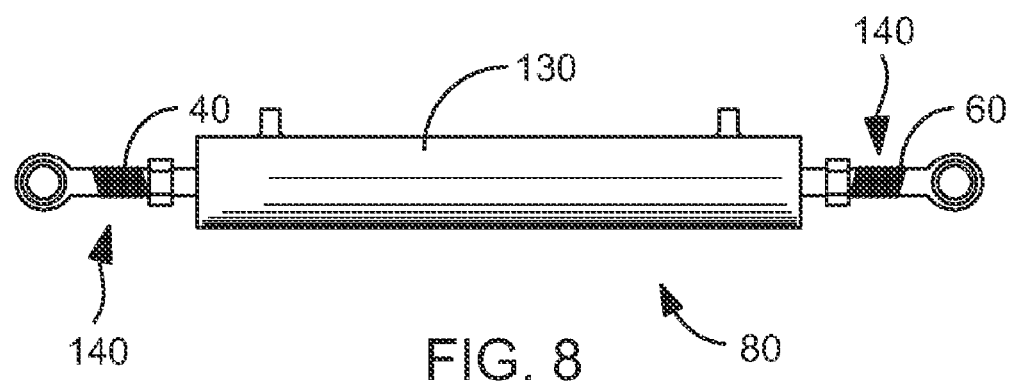
FIG. 8 is a front elevational view of the invention.

With respect to the drawings, FIGS. 1 & 2 illustrate a panhard bar 10 for a vehicle 20 having a chassis 22, a front axle 23, a rear axle 24, front wheels 27, back wheels 28, and a cockpit 35 for a driver 30. In FIG. 3, a first rod 40 is fixed to the chassis 22 with a first attachment means 50 at a first rod end 44 thereof. A second rod 60 is fixed to the front axle 23 with a second attachment means 70 at a first rod end 64 thereof. The first rod 40 is fixed to the second rod 60 via an adjustment means 80 (FIGS. 7 & 8). The panhard bar 10 can be used with either the front axle 23 or the rear axle 24 of the vehicle 20. The panhard bar 10 is preferably made primarily from a rigid and durable material such as metal, but can also be formed from any suitable material, such as a durable and rigid plastic material, if desired.

Figure 5:
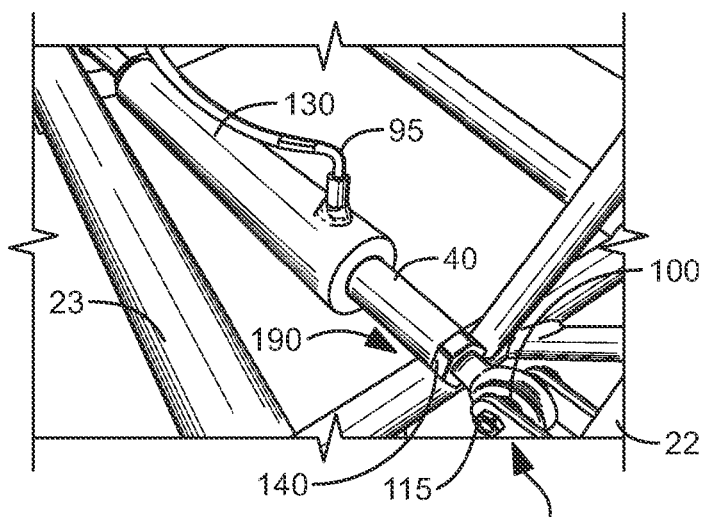
FIG. 5 is a perspective view of an adjustment means, illustrating a hydraulic cylinder.

In FIG. 5, one embodiment of the first attachment means 50 is an aperture 100 in the first rod end 44 of the first rod 40 that may be fixedly connected to a threaded shaft 110 fixed to the chassis 22 with a nut 115. Another embodiment of the first attachment means 50 is a pin and clip (not shown) to fix the first rod end 44 of the to the chassis 22. In FIG. 5, one embodiment of the second attachment means 70 is an aperture in the first rod end 64 of the second rod 60 that may be fixedly connected to a threaded shaft 110 fixed to the front axle 23 with a nut 115. Another embodiment of the second attachment means 70 is a pin and clip (not shown) to fix the first rod end 64 of the second rod 60 to the front axle 23.

As illustrated in FIG. 3, an adjustment means 80 is fixed to a second rod end 46 of the first rod 40 and the second rod end 66 of the second rod 60. The adjustment means 80 allows for selective adjustment of the relative positions of each second rod end 46, 66 with respect to the other second rod end 46, 66, thereby lengthening or shortening the panhard bar 10. Lengthening or shortening the panhard bar 10 moves the front axle 23 towards the left or right of the vehicle 20 (FIGS. 1 & 2). Changing the position of the front axle 23 changes the tracking of the front wheels 27 to the rear wheels 28. The panhard bar 10 can be used with either the front axle 23 or the rear axle 24 of the vehicle 20. Moving either the front axle 23 or the rear axle 24 towards the left or right of the vehicle 20 has substantially the same effect in changing the tracking of the front wheels 27 to the rear wheels 28.

In FIG. 1, an actuator 90 is interconnected to the adjustment means 80 and fixed within the vehicle cockpit 35 in reach of the driver 30. In a preferred embodiment, the actuator 90 is interconnected to the adjustment means 80 via a cable 95 (FIG. 5).

Figure 4:
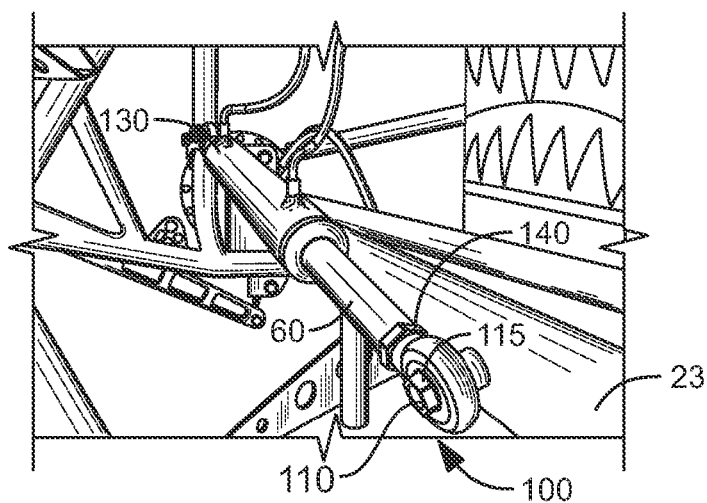
FIG. 4 is a perspective view of the invention, illustrating a panhard bar and a first attachment means.

In FIGS. 3 & 4, a preferred embodiment of the adjustment means 80 includes a hydraulic cylinder 130 fixed at either end to the second ends 46, 66 of the first 40 and second rods 60. The hydraulic cylinder 130 is adapted to adjust the relative distance of each second rod end 46, 66 with the other second rod end 46, 66. In FIG. 7, an alternate embodiment of the adjustment means 80 includes a turnbuckle mechanism 140 and the actuator 90 is a cable 150 fixed at one end 154 to a lever 160 connected to the turnbuckle mechanism 140, a second end 156 of the cable fixed to a second lever 170. The driver 30 may manually adjust the second lever 170 to cause the cable 150 to rotate the turnbuckle mechanism 140 to adjust the relative distance of each second rod end 46, 66 of each rod 40, 60, thereby lengthening or shortening the panhard bar 10.

In FIG. 4, an alternate embodiment of the second rod 60 further includes a first manual adjustment means 180 comprising a turnbuckle mechanism 140 for effectively lengthening or shortening the second rod 60. In FIG. 5, an alternate embodiment of the first rod 40 further includes a second manual adjustment means 190 comprising a turnbuckle mechanism 140 for effectively lengthening or shortening the first rod 40.

Illustrated in FIG. 1, the actuator 90 allows the driver 30 to actuate the adjustment means 80 while the vehicle 20 is in motion to control the tracking of the front axle 23 with respect to the chassis 22. Adjusting the tracking of the vehicle 20 as track conditions change improves the turning ability of the vehicle 20.

Figure 6:
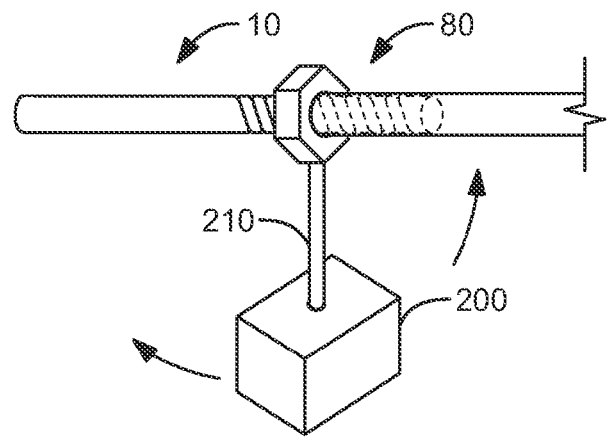
FIG. 6 is a perspective view of an adjustment means, illustrating a weight suspended on a shaft.

An alternative embodiment of the panhard bar 10 includes an adjustment means 80 with a weight 200 suspended on a shaft 210 (FIG. 6). The weight 200 is moved by inertia based on the movement of the vehicle 20. In this alternate embodiment of the panhard bar 10, the adjustment means 80 controls the tracking of the front axle 23 with respect to the chassis 22 based on the movement of the vehicle 20. In one embodiment, the weight 200 moves based on longitudinal acceleration or deceleration of the vehicle 20. The deceleration forces indicate a turn on the track is approaching, and acceleration forces indicate a straightaway of the track is approaching. In an alternate embodiment, the weight 200 moves based on lateral acceleration or deceleration of the vehicle 20. In another embodiment, the adjustment means 80 responds to the front wheels turning to the left or right. An alternate embodiment of the adjustment means 80 includes an accelerometer to detect a change in movement of the vehicle 20 and automatically adjust the panhard bar 10 accordingly to improve the tracking of the vehicle 20.

In use, the panhard bar 10 can be used to adjust a vehicle's wheel tracking while the vehicle is in motion. A panhard bar 10 of claim 1 installed in a vehicle 20 is provided. The vehicle 20 is driven. Any need for adjustment of the panhard bar 10 length is sensed based on vehicle 20 performance when accelerating, braking, or steering. The panhard bar 10 is adjusted accordingly. The steps of sensing any need for adjustment of the panhard bar 10 and adjusting the panhard bar 10 accordingly are repeated until the vehicle 20 is stopped.

While a particular form of the invention has been illustrated and described, it will be apparent that various modifications can be made without departing from the spirit and scope of the invention. For example, the adjustment means 80 can include a motorized gear system (not shown) connected to the panhard bar 10 to adjust the tracking of the vehicle 20. Furthermore, the adjustment means 80 can be a combination of a driver 30 controlled adjustment means 80 and an automatic adjustment means 80 using a weight 200. Accordingly, it is not intended that the invention be limited, except as by the appended claims.

What is claimed is:

1. A panhard bar for a vehicle having a chassis, an axle, and a cockpit for a driver, the panhard bar comprising:
   a first rod fixed to the chassis with a first attachment means at a first end thereof;
   a second rod fixed to the axle with a second attachment means at a first end thereof;
   an adjustment means fixed to a second end of the first rod and the second end of the second rod, the adjustment means allowing for selective adjustment of the relative positions of each second end with respect to the other; and
   an actuator interconnected to the adjustment means and fixed within the vehicle cockpit;

whereby the actuator allows the driver to actuate the adjustment means while the vehicle is in motion to control the tracking of the axle with respect to the chassis.

2. The panhard bar of claim 1 wherein the first attachment means is an aperture in the first rod that may be fixedly connected to a threaded shaft fixed to the chassis with a nut.

3. The panhard bar of claim 1 wherein the second attachment means is an aperture in the second rod that may be fixedly connected to a threaded shaft fixed to the axle with a nut.

4. The panhard bar of claim 1 wherein the adjustment means includes a hydraulic cylinder fixed at either end to the second ends of the first and second rods, the hydraulic cylinder adapted to adjust the relative distance of each second end with the other.

5. The panhard bard of claim 1 wherein the adjustment means includes a turnbuckle mechanism and the actuator is a cable fixed at one end to a lever connected to the turnbuckle mechanism, a second end of the cable fixed to a second lever, whereby the driver may manually adjust the second lever to cause the cable to rotate the turnbuckle mechanism to adjust the relative distance of each second end of each rod.

6. The panhard bar of claim 1 wherein the second rod further includes a first manual adjustment means comprising a turnbuckle mechanism for effectively lengthening or shortening the second rod.

7. The panhard bar of claim 1 wherein the first rod further includes a second manual adjustment means comprising a turnbuckle mechanism for effectively lengthening or shortening the first rod.

8. A method of adjusting a vehicle's wheel tracking while the vehicle is in motion, the method comprising the steps of:
   a. providing the panhard bar of claim 1 installed in the vehicle;
   b. driving the vehicle;
   c. sensing any need for adjustment of the panhard bar length based on vehicle performance when accelerating, braking, or steering;
   d. adjusting the panhard bar accordingly.

9. The method of claim 8 wherein steps c and d are repeated until the vehicle is stopped.

* * * * *